(12) United States Patent
Blake et al.

(10) Patent No.: US 8,423,736 B2
(45) Date of Patent: Apr. 16, 2013

(54) MAINTAINING CACHE COHERENCE IN A MULTI-NODE, SYMMETRIC MULTIPROCESSING COMPUTER

(75) Inventors: Michael A. Blake, Poughkeepsie, NY (US); Garrett M. Drapala, Poughkeepsie, NY (US); Pak-Kin Mak, Poughkeepsie, NY (US); Vesselina K. Papazova, Poughkeepsie, NY (US); Craig R. Walters, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 12/816,464

(22) Filed: Jun. 16, 2010

(65) Prior Publication Data
US 2011/0314228 A1    Dec. 22, 2011

(51) Int. Cl.
*G06F 12/00*    (2006.01)

(52) U.S. Cl.
USPC ......................................................... 711/162

(58) Field of Classification Search ........................ None
See application file for complete search history.

(56) References Cited

U.S. PATENT DOCUMENTS

| | | | |
|---|---|---|---|
| 7,483,428 B2 | 1/2009 | Goodman et al. | |
| 2009/0210626 A1* | 8/2009 | Papazova et al. | 711/124 |
| 2010/0281221 A1* | 11/2010 | Cantin et al. | 711/132 |

* cited by examiner

*Primary Examiner* — Brian Peugh
(74) *Attorney, Agent, or Firm* — Edward J. Lenart; John E. Campbell; Biggers & Ohanian, LLP

(57) ABSTRACT

Maintaining cache coherence in a multi-node, symmetric multiprocessing computer, the computer composed of a plurality of compute nodes, including, broadcasting upon a cache miss by a first compute node a request for a cache line; transmitting from each of the other compute nodes to all other nodes the state of the cache line on that node, including transmitting from any compute node having a correct copy to the first node the correct copy of the cache line; and updating by each node the state of the cache line in each node, in dependence upon one or more of the states of the cache line in all the nodes.

18 Claims, 4 Drawing Sheets

MAINTAINING CACHE COHERENCE IN A MULTI-NODE, SYMMETRIC MULTIPROCESSING COMPUTER

BACKGROUND OF THE INVENTION

1. Field of the Invention

The field of the invention is data processing, or, more specifically, methods, apparatus, and products for maintaining cache coherence in a multi-node, symmetric multiprocessing ('SMP') computer.

2. Description of Related Art

Contemporary high performance computer systems, such as, for example, the IBM System z series of mainframes, are typically implemented as multi-node, symmetric multiprocessing ('SMP') computers with many compute nodes. SMP is a multiprocessor computer hardware architecture where two or more, typically many more, identical processors are connected to a single shared main memory and controlled by a single operating system. Most multiprocessor systems today use an SMP architecture. In the case of multi-core processors, the SMP architecture applies to the cores, treating them as separate processors. Processors may be interconnected using buses, crossbar switches, mesh networks, and the like. Each compute node typically includes a number of processors, each of which has at least some local memory, at least some of which is accelerated with cache memory. The cache memory can be local to each processor, local to a compute node shared across more than one processor, or shared across nodes. All of these architectures require maintenance of cache coherence among the separate caches.

In a traditional strong store ordered, symmetric multiprocessing computer system composed of many compute nodes, with the compute nodes interconnected through a given bus topology, with a coherence protocol that exchanges address, data, and coherency information, the release of a cache line and system resources by the protocol for completion of a memory/cache to cache operation does not occur until after a protracted series of communications is completed, including confirmation from all other caches on the other nodes that those caches have completed all coherency operations according to the protocol. Waiting for such confirmation before releasing the cache line and system resources represents additional latency in memory operations. In addition, in traditional protocols, even if the requesting node releases the line before receiving full confirmation, such protocols include additional communications regarding coherence state from the requesting node to the other nodes. Such additional communications represent additional latency in that the other nodes cannot be relied upon for additional coherency operations until all such confirmations are received by the requesting node.

SUMMARY OF THE INVENTION

Methods, apparatus, and computer program products for maintaining cache coherence in a multi-node, symmetric multiprocessing computer, the computer composed of a plurality of compute nodes, each compute node having at least one processor operatively coupled through a cache controller to at least one cache of main memory, the main memory shared among the compute nodes, each cache controller coupled for data communications to cache controllers on other compute nodes, including responsive to a cache miss of a cache line on a first one of the compute nodes, broadcasting by the first compute node to other compute nodes a request for the cache line; responsive to receiving the broadcast request, transmitting from each of the compute nodes receiving the broadcast request to all other nodes the state of the cache line on that node, including, if at least one of the compute nodes has a correct copy of the cache line, transmitting from the at least one compute node to the first node the correct copy of the cache line; and updating by each node the state of the cache line in each node, in dependence upon one or more of the states of the cache line in all the nodes.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
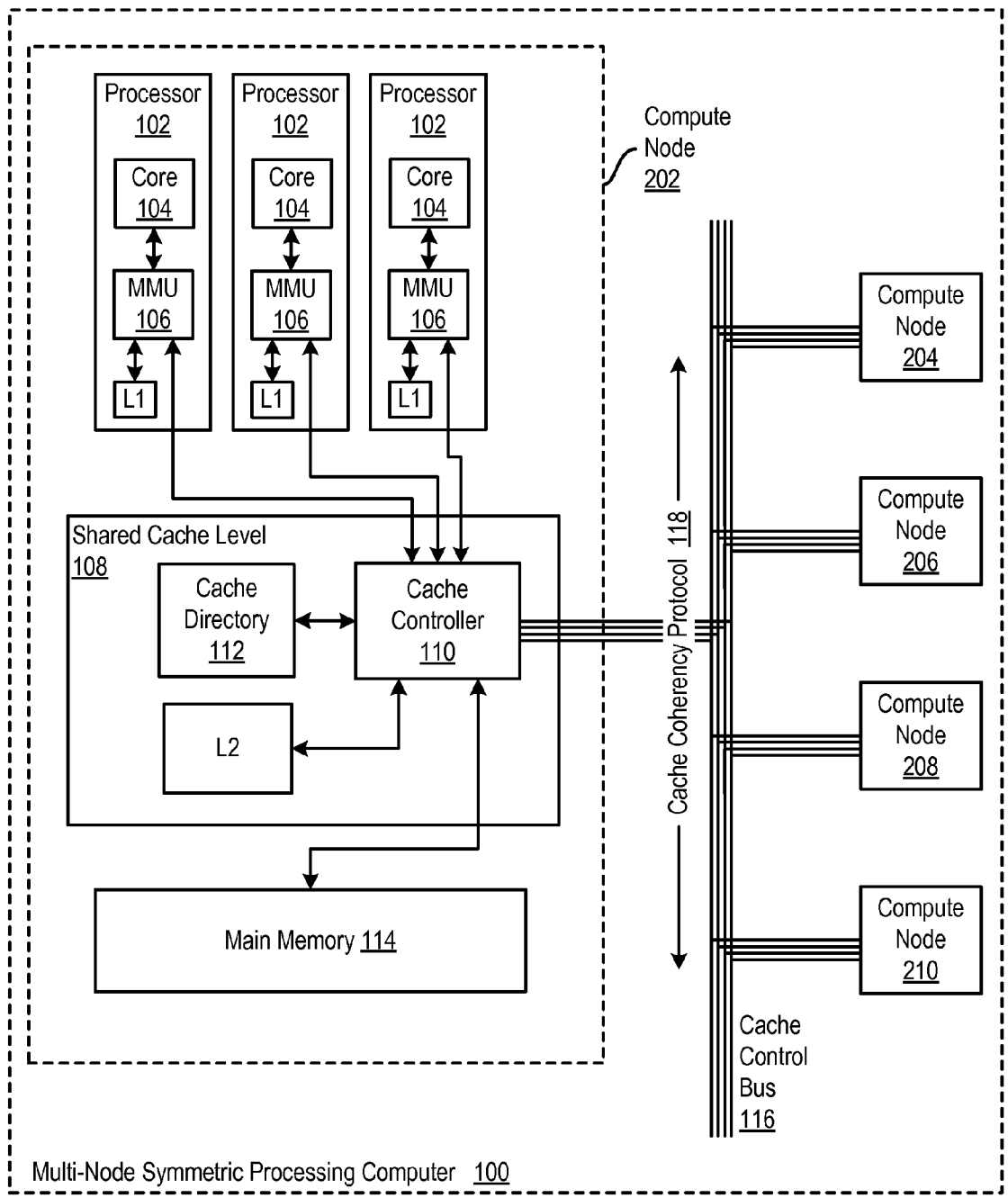
FIG. 1 sets forth a functional block diagram of an example of a multi-node, symmetric multiprocessing computer that maintains cache coherence according to embodiments of the present invention.

Example methods, apparatus, and computer program products for maintaining cache coherence in a multi-node, symmetric multiprocessing computer according to embodiments of the present invention are described with reference to the accompanying drawings, beginning with FIG. 1. FIG. 1 sets forth a functional block diagram of an example of a multi-node, symmetric multiprocessing computer (100) that maintains cache coherence according to embodiments of the present invention. "Cache coherence," as the term is used here, generally indicates:

A cache read by processor P to location X following a write by P to X, with no writes of X by any other processor between P's write and read instructions, must always return the value written by P. This requirement is a condition of program order preservation and is needed even in monoprocessed architectures.

A cache read by processor P1 to location X following a write by another processor P2 to X must return the value written by P2 if no other writes to X are made by any processor between the two accesses. This condition defines a coherent view of cache memory. If processors can read the same old value after the write by P2, the cache is incoherent.

Cache writes to the same location must be sequenced. In other words, if location X received two different values A and B, in this order, by any two processors, the processors can never read location X as B and then read it as A. The location X must be seen with values A and B in that order.

Cache coherence in caches distributed across compute nodes is maintained by communications protocols called 'cache coherence protocols.' There are a number of cache coherence protocols, traditionally named according to the cache line states supported by the protocol. The MSI protocol, for example, supports cache line states of:

MODIFIED: A cache line in the MODIFIED cache line state has been modified in the cache. The data in the cache is then inconsistent with the backing store (e.g., main memory). A cache with a cache line in the "M" state has the responsibility to write the cache line to the backing store when the cache line is evicted.

SHARED: A cache line in the SHARED cache line state is unmodified and exists in at least one cache. The cache can evict the data without writing it to the backing store.

INVALID: A cache line in the INVALID state contains invalid data, and must be fetched from memory or another cache if the cache line is to be stored in this cache. Note that cache lines that are completely missing from a cache may also be characterized as INVALID in the cache.

The MESI protocol adds an EXCLUSIVE cache line state to the states of the MSI protocol. The MOESI protocol adds an OWNED cache line state to states of the MESI protocol. And so on.

The example computer (100) of FIG. 1 includes several compute nodes (202, 204, 206, 208, 210). Actually the example of FIG. 1 illustrates a computer (100) with five compute nodes, but this number five is only for ease of explanation, not for limitation of the invention. Readers will recognize that SMP computers that maintain cache coherence according to embodiments of the present invention can have any number of compute nodes. The IBM System z10™ series of mainframe computers, for example, each can include up to 64 compute nodes or, in z10 terminology, "frames." The IBM Blue Gene™ series of supercomputers can support thousands of compute nodes.

The diagram of one of the compute nodes (202) is expanded to illustrate the structure and components typical to all of the compute nodes. Each compute node includes a number of computer processors (102). The number of computer processors per compute node is illustrated here as three, but this is for ease of explanation, not for limitation. Readers will recognize that each compute node can include any number of computer processors as may occur to those of skill in the art. The compute nodes in the IBM System z10 series of mainframe computers, for example, each can include up to 64 processors.

Each processor (102) in the example of FIG. 1 includes a compute core (104) that is coupled for memory operations through a memory management unit ('MMU') (106) and a cache controller (110) to two caches L1 and L2, and to main memory (114). L1 is a relatively small, high speed cache fabricated into the processor itself. The MMU (106) includes address translation logic, a translation lookaside buffer, controls for the on-processor cache L1, and so on. The cache controller (110), with the L2 cache, a cache directory (112), and a cache control bus (116) bearing data communications among the compute nodes according to a cache coherency protocol (118), implements a shared cache level (108) across the nodes (202, 204, 206, 208, 210) of the computer.

The main memory (114) is the principal, random access store of program data and program instructions for data processing on the computer (100). Main memory (114) is characterized by memory latency, the time required for a memory access, a read or write to or from main memory. In this example, main memory (114) represents a single extent of physical address space, but main memory is physically segmented and distributed across compute nodes, so that a main memory access from a processor on one compute to a main memory segment on the same node has smaller latency than an access to a segment of main memory on another compute node. This segmentation of main memory is described here for ease of explanation of relative effects on latency, not for limitation of the invention. Main memory can be implemented off-node entirely in a single, non-segmented set, separately from processors on nodes exclusively dedicated to main memory, and in other ways as will occur to those of skill in the art. However main memory is implemented, though, it is always much slower than a cache hit.

The caches L1 and L2 are specialized segments of memory used by the processors (102) to reduce memory access latency. Each cache is smaller and faster than main memory, and each cache stores copies of data from frequently used main memory locations. When a processor needs to read from or write to a location in main memory, it first checks whether a copy of that data, a "cache line," is in a cache. If so, the processor immediately reads from or writes to the cache, which is much faster than reading from or writing to main memory. As long as most memory accesses are cached memory locations, the average latency of memory accesses will be closer to the cache latency than to the latency of main memory. As mentioned, main memory is much slower than any cache, and cache misses extract a heavy toll in memory access latency.

Cache memory is organized in blocks of data referred to as 'cache lines.' Each cache line in different designs may range in size from 8 to 512 bytes or more. The size of a cache line typically is larger than the size of the usual access requested by a CPU instruction, which ranges from 1 to 16 bytes—the largest addresses and data typically handled by current 32 bit- and 64 bit-architectures being 128 bits or 16 bytes in length. Each cache line is characterized by a 'tag' composed of most significant bits of the beginning address where the contents of the cache line are stored in main memory.

In the example of FIG. 1, caches L1 and L2 implement a multi-level cache with two levels. Multi-level caches address the tradeoff between cache latency and hit rate. Larger caches have better hit rates but longer latency. To address this tradeoff, many computers use multiple levels of cache, with small fast caches backed up by larger slower caches. Multi-level caches generally operate by checking the smallest Level 1 (L1) cache first; if it hits, the processor proceeds at high speed. If the smaller cache misses, the next larger cache (L2) is checked, and so on, before main memory is checked. The example computer of FIG. 1 implements two cache levels, but this is only for ease of explanation, not for limitation. Many computers implement additional levels of cache, three or even four cache levels. Some processors implement as many as three levels of on-chip cache. For example, the Alpha 21164™ has a 96 KB on-die L3 cache, and the IBM POWER4™ has a 256 MB L3 cache off-chip, shared among several processors. In the example of FIG. 1, the L2 cache is shared directly among the processors on a compute node and among processor on all compute nodes through cache controller (110) on each node, the cache control bus (116), and the cache coherency protocol (118).

The cache directory (112) is a repository of information regarding cache lines in the caches. The directory records, for each cache line in all of the caches on a compute node, the identity of the cache line or cache line "tag" and the cache line state, MODIFIED, SHARED, INVALID, and so on. The MMUs (106) and the cache controllers (110) consult and update the information in the cache directory with every cache operation on a compute node. The cache controller (110), connected directly to L2, has no direct connection to L1—and obtains information about cache lines in L1 from the cache directory (112).

The cache controller (110) is a logic circuit that manages cache memory, providing an interface among processors (102), caches, and main memory (114). Although the cache controller (110) here is represented externally to the processors (102), cache controllers are often integrated on modern computers directly into a processor or an MMU. In this example, the MMUs (106) in fact include cache control logic for the L1 caches.

In the example of FIG. 1, when cache controller (110) on compute node (202) experiences a cache miss for a cache line in cache L2, which of course follows a cache miss on L1, the cache controller (110) broadcasts to the other compute nodes a request for the cache line. At this point in processing, but for the cache coherency protocol that enables the cache controller to request the cache line from other compute nodes, the cache controller on node (202) would be forced to retrieve the cache line from main memory (114), a very undesirable result in terms of memory latency. Responsive to receiving the broadcast request, each of the other compute nodes (204, 206, 208, 210), that is, the nodes that received the broadcast request, transmits to all other nodes the state of the cache line on that node. If at least one of the compute nodes that received the broadcast request has a correct copy of the cache line, that node also transmits to the first node, the node that issued the broadcast request, the correct copy of the cache line.

Each node (202, 204, 206, 208, 210) then updates the state of the cache line in that node, in dependence upon one or more of the states of the cache line in all the nodes. "Update" in this context means confirming that the current cache line state is correct in view of the information received from all the other nodes—regardless whether the state changes. Updating therefore may not require a change in a cache line state on any particular node. If, for example, a node that received the broadcast, in the context of a READ memory operation, had a correct copy of a cache line in SHARED state, that node would transmit the cache line to the node that issued the broadcast request, but the SHARED state would remain unchanged in the updating confirmation of the cache line state in that node. If, for a further example, a node that received the broadcast, in the context of a WRITE memory operations, had a correct copy of a cache line in SHARED state, that node would transmit the cache line to the node that issued the broadcast request, but the SHARED state would change to INVALID in the updating of the cache line state.

Upon obtaining a correct copy of the cache line, the node (202) that issued the broadcast request releases the cache line for subsequent memory operations. There are two ways to obtain the correct copy of the cache line. If the node (202) that issued the broadcast request does not receive a correct copy in response to the broadcast request, the node obtains a correct copy of the cache line by retrieving the contents of the cache line from main memory (114)—experiencing substantially higher latency. If at least one of the compute nodes that received the broadcast request (204, 206, 208, 210) has a correct copy of the cache line when it receives the broadcast request, that node transmits to the node that issued the broadcast request the correct copy of the cache line—thereby avoiding a main memory access and the substantially higher latency incurred by this event. Before the node (202) that issued the broadcast request is enabled to issue another broadcast request for the same cache line, the nodes (204, 206, 208, 210) that received the broadcast request confirm to the node that issued the broadcast request that all the nodes that received the broadcast have completed the updating of the state of the cache line in each node.

Figure 2:
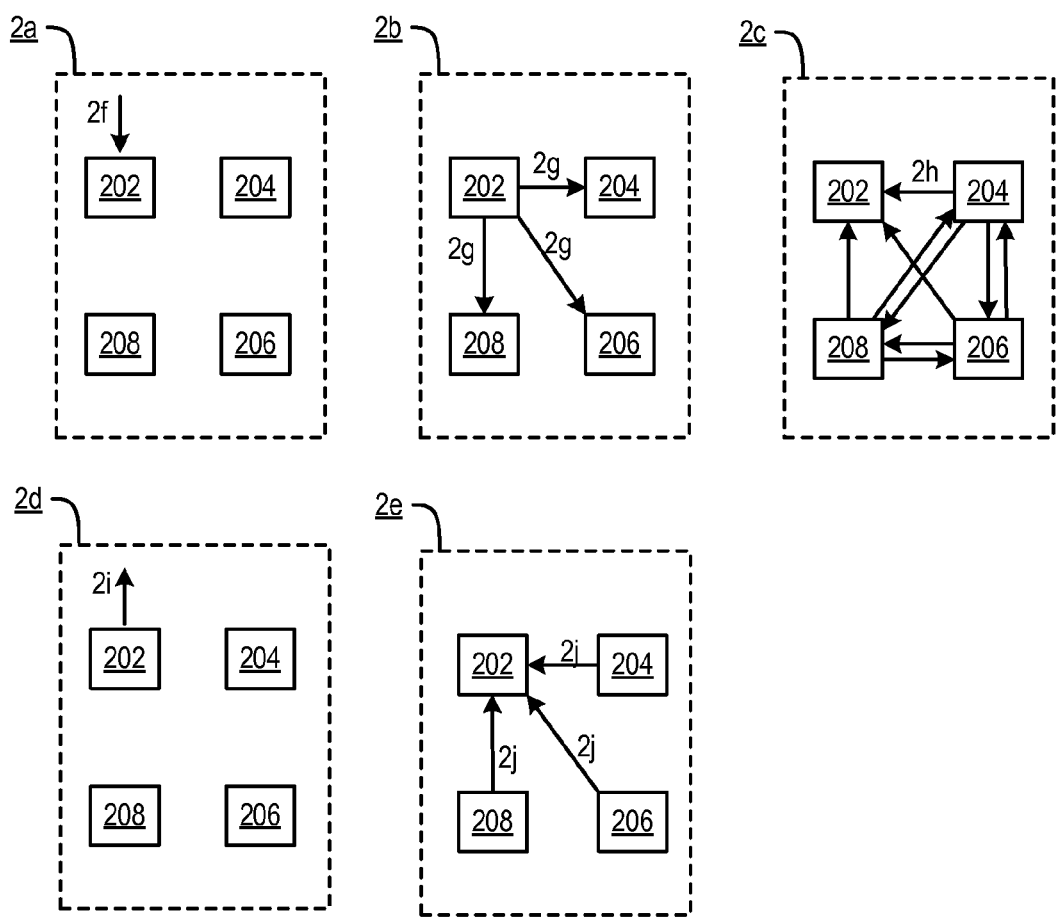
FIG. 2 illustrates a data processing sequence, steps 2a-2e, in a cache coherence protocol according to embodiments of the present invention.

For further explanation, FIG. 2 illustrates a data processing sequence, steps 2a-2e, in a cache coherence protocol according to embodiments of the present invention. In the example of FIG. 2, in step 2a, a cache controller on compute node (202) experiences a cache miss (2f) for a cache line. Compute node (202) then at step 2b broadcasts to the other compute nodes (204, 206, 208) a request (2g) for the cache line. Responsive to receiving the broadcast request (2g), each of the other compute nodes (204, 206, 208) in step 2c, transmits to all other nodes the state (2h) of the cache line on that node. If at least one of the compute nodes (204, 206, 208) that received the broadcast request (2g) has a correct copy of the cache line, that node also transmits in (2h) to the node that issued the broadcast request the correct copy of the cache line. Also in step 2c, each node (202, 204, 206, 208) updates the state of the cache line in that node (in parallel), in dependence upon one or more of the states of the cache line in all the nodes. In step 2d, upon obtaining a correct copy of the cache line, the node (202) that issued the broadcast request releases (2i) the cache line for subsequent memory operations. Before the node (202) that issued the broadcast request (2g) is enabled to issue another broadcast request for the same cache line or reuse the remote cache controller, the nodes (204, 206, 208) that received the broadcast request confirm (2j in step 2e) to the node (202) that issued the broadcast request (2g) that all the nodes that received the broadcast have completed the updating of the state of the cache line in each node.

Figure 3:
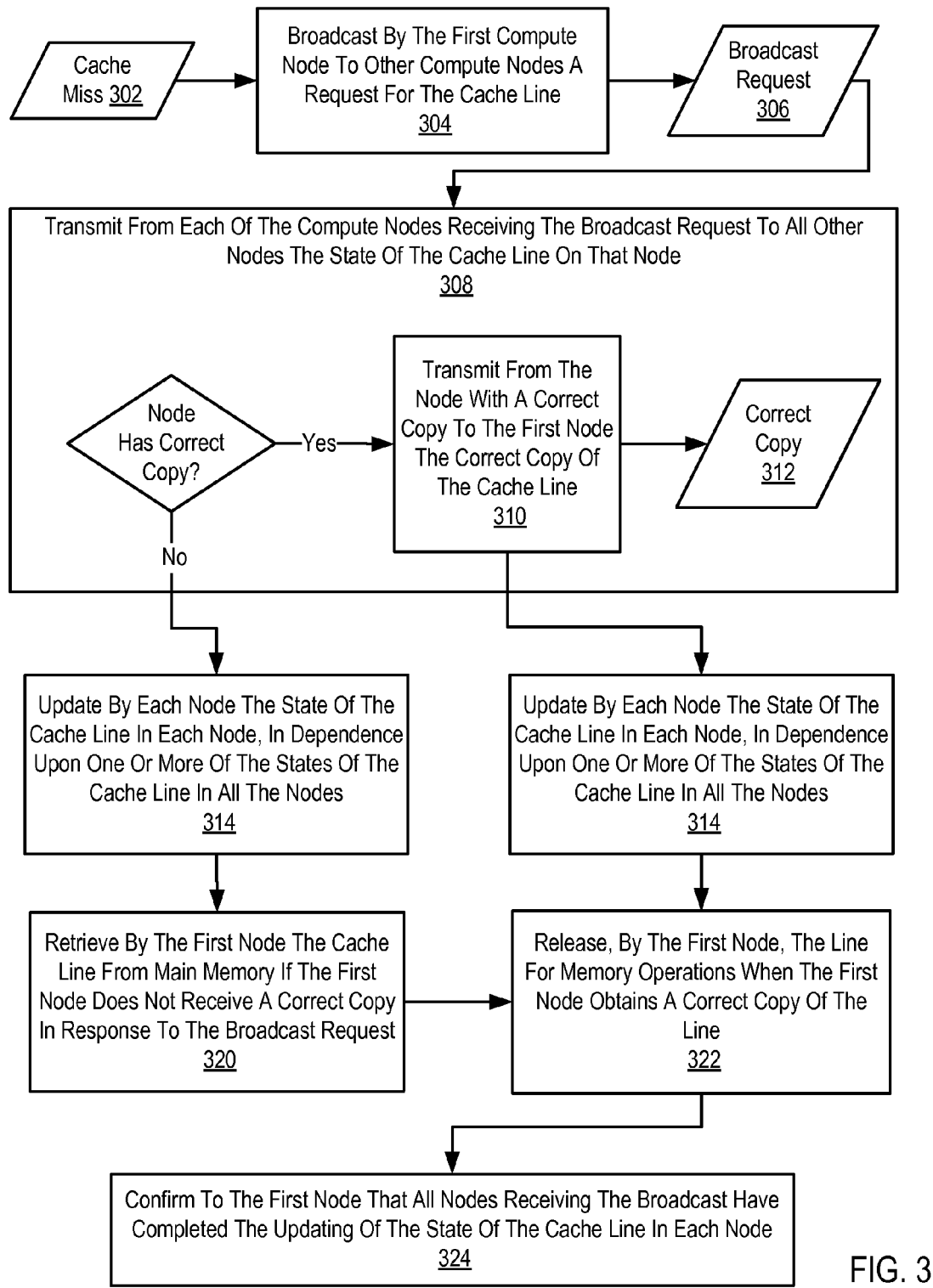
FIG. 3 sets forth a flow chart illustrating an example method of maintaining cache coherence in a multi-node, symmetric multiprocessing computer according to embodiments of the present invention.

For further explanation, FIG. 3 sets forth a flow chart illustrating an example method of maintaining cache coherence in a multi-node, symmetric multiprocessing computer according to embodiments of the present invention. The method of FIG. 3 is implemented by and upon a multi-node, symmetric multiprocessing computer (100) like the one illustrated and described above with reference to FIG. 1. The method of FIG. 3 is described here, therefore, with reference to both FIGS. 1 and 3, using reference numbers from each drawing. In the computer (100), each compute node (202, 204, 206, 208, and 210) includes at least one processor (102) operatively coupled through a cache controller (110) to at least one cache (L2) of main memory (114). The main memory (114) is shared among the compute nodes (202, 204, 206, 208, and 210), and each cache controller (110) is coupled for data communications through a cache control bus (116) to cache controllers on the other compute nodes (202, 204, 206, 208, and 210).

Responsive to a cache miss (302) of a cache line on a first one of the compute nodes (202), the method of FIG. 3 includes broadcasting (304) by the first compute node (202) to other compute nodes (204, 206, 208, and 210) a request (306) for the cache line. Such a broadcast request (206) is often called an address broadcast and the request broadcasts the tag of the cache line sought to each of the remote nodes in the system. In the some embodiments, the broadcast request (306) also includes a specification of a type of memory instruction that generated the cache miss (302). Including the type of memory instruction in the broadcast request allows the nodes receiving the broadcast to update the state of the cache line immediately because the updated state is dependent upon the type of memory instruction.

Responsive to receiving the broadcast request (306), the method of FIG. 3 includes transmitting (308) from each of the compute nodes (204, 206, 208, and 210) receiving the broadcast request (306) to all other nodes the state of the cache line on that node (204, 206, 208, and 210), including, if at least one of the compute nodes has a correct copy (312) of the cache line, transmitting from the at least one compute node to the first node (202) the correct copy (312) of the cache line;

The method of FIG. 3 also includes updating (314) by each node (202, 204, 206, 208, and 210) the state of the cache line in each node (202, 204, 206, 208, and 210), in dependence upon one or more of the states of the cache line in all the nodes. As mentioned, "update" in this context means confirming that the current cache line state is correct in view of the information received from the other nodes—regardless whether the state changes. Updating therefore may not require changing a cache line state on any particular node.

The method of FIG. 3 also includes retrieving (320) by the first node (202) the cache line from main memory (114) if the first node does not receive a correct copy in response to the broadcast request. As mentioned above, retrieving the cache line from main memory represents a very bad result in terms of memory latency. By broadcasting the state of the line in each node to all other nodes in parallel (2h), however, the example processing sequence of FIG. 2 reduces the memory access penalty, effecting an earlier release of system resources as a result of the reduced latency on the coherent view of the system over prior art which relied on the initiating node to broadcast the coherent view to all nodes in the system.

The method of FIG. 3 also includes releasing (322), by the first node (202), the line for subsequent memory operations when the first node obtains a correct copy of the line. Releasing (322), by the first node (202), the line for subsequent memory operations when the first node obtains a correct copy of the line completes the current memory operation on the line and frees the line to accept subsequent memory operations to be executed on the line.

The method of FIG. 3 also includes confirming (324) to the first node (202) that all nodes (204, 206, 208, and 210) receiving the broadcast (306) have completed the updating of the state of the cache line in each node (202, 204, 206, 208, and 210). Upon receiving confirmation that the state of the cache line in each node is updated, the first node (202) that issued the broadcast request is enabled to issue another broadcast request for another cache line in response to another cache miss—reusing the same remote resources, though in typical embodiments there are a plethora of remote resources, the accelerated confirmation according to embodiments of the present invention reduces the remote resource utilization and enhances system performance.

In some embodiments, to reduce the latency in executing the memory operation, releasing (322), by the first node (202), the line for subsequent memory operations when the first node (202) obtains a correct copy (312) of the line includes releasing the line for subsequent memory operations before receiving responsive transmissions from all the nodes receiving the broadcast request. That is, in some embodiments, upon receiving a correct copy of the cache line, the first node does not wait for a confirmation that every node has updated the state of the cache line before releasing the line for subsequent operations.

Example embodiments of the present invention are described largely in the context of a fully functional computer system for maintaining cache coherence in a multi-node, SMP computer. Readers of skill in the art will recognize, however, that the present invention also may be embodied in a computer program product disposed upon computer readable storage media for use with any suitable data processing system, such as, for example, the computer readable media illustrated as an optical disk (60) on FIG. 4. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, that is as apparatus, or as a method or a computer program product. Accordingly, aspects of the present invention may take the form of an entirely hardware embodiment, embodiments that are at least partly software (including firmware, resident software, micro-code, etc.), with embodiments combining software and hardware aspects that may generally be referred to herein as a "circuit," "module," "apparatus," or "system." Furthermore, aspects of the present invention may take the form of a computer program product embodied in one or more computer readable media (e.g., optical disk (60) on FIG. 4) having computer readable program code embodied thereon.

Any combination of one or more computer readable media may be utilized. A computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 4:
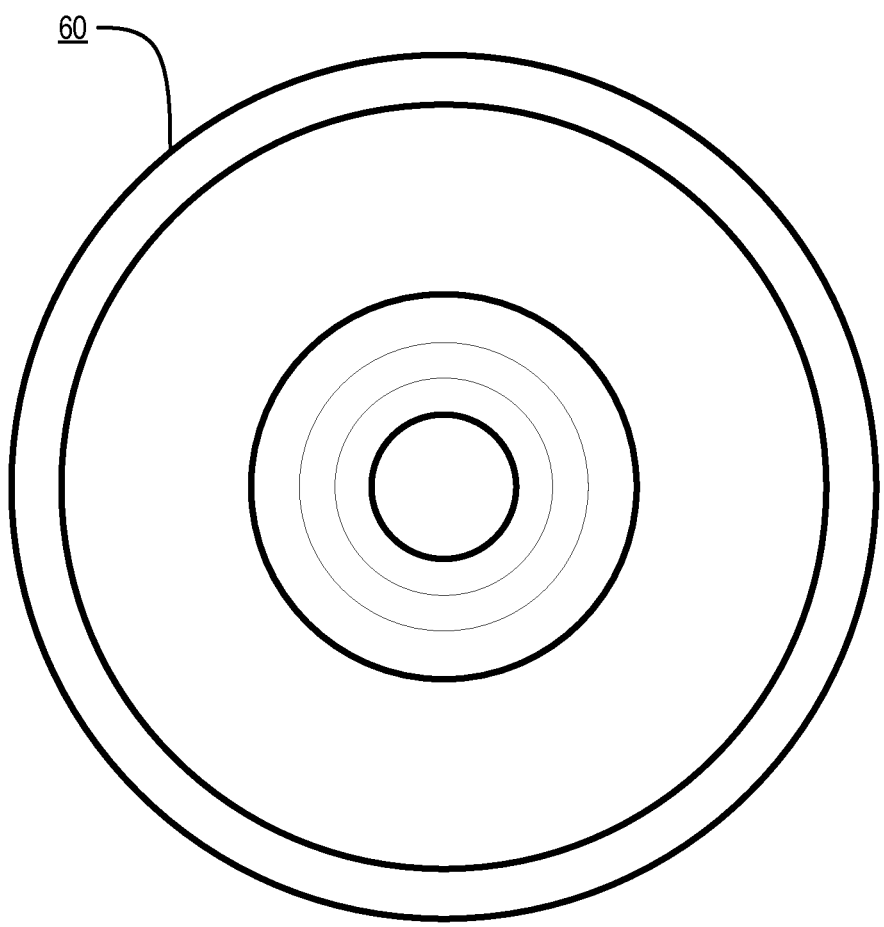
FIG. 4 illustrates an example form of computer readable media bearing program code which executable on a multi-node SMP computer, an article of manufacture that is a computer program product according to embodiments of the present invention.

These computer program instructions may also be stored in a computer readable medium that can direct a computer, other programmable data processing apparatus, or other devices to function in a particular manner, such that the instructions stored in the computer readable medium produce an article of manufacture (e.g., optical disk (60) on FIG. 4) including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in a flowchart or block diagram may represent a module, segment, or portion of code or other automated computing machinery, which comprises one or more executable instructions or logic blocks for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of maintaining cache coherence in a multi-node, symmetric multiprocessing computer, the computer comprising a plurality of compute nodes, each compute node comprising at least one processor operatively coupled through a cache controller to at least one cache of main memory, the main memory shared among the compute nodes, each cache controller coupled for data communications to cache controllers on other compute nodes, the method comprising:

responsive to a cache miss of a cache line on a first one of the compute nodes, broadcasting by the first compute node to other compute nodes a request for the cache line;

responsive to receiving the broadcast request, transmitting from each of the compute nodes receiving the broadcast request to all other nodes the state of the cache line on that node, including, if at least one of the compute nodes has a correct copy of the cache line, transmitting from the at least one compute node to the first node the correct copy of the cache line; and updating by each node the state of the cache line in each node, in dependence upon one or more of the states of the cache line in all the nodes.

2. The method of claim 1 further comprising retrieving by the first node the cache line from main memory if the first node does not receive a correct copy in response to the broadcast request.

3. The method of claim 1 wherein the broadcast request includes a specification of a type of memory instruction that generated the cache miss.

4. The method of claim 1 further comprising releasing, by the first node, the cache line for subsequent operations when the first node obtains a correct copy of the cache line.

5. The method of claim 1 further comprising releasing, by the first node, the cache line for subsequent operations when the first node obtains a correct copy of the cache line, including releasing the cache line for memory operations before receiving responsive transmissions from all the nodes receiving the broadcast request.

6. The method of claim 1 further comprising confirming to the first node that all nodes receiving the broadcast have completed the updating of the state of the cache line in each node.

7. A multi-node, symmetric multiprocessing computer configured to maintain cache coherence, the computer comprising a plurality of compute nodes, each compute node comprising at least one processor operatively coupled through a cache controller to at least one cache of main memory, the main memory shared among the compute nodes, each cache controller coupled for data communications to cache controllers on other compute nodes, the cache controllers configured to function by:

responsive to a cache miss of a cache line on a first one of the compute nodes, broadcasting by cache controller of the first compute node to other compute nodes a request for the cache line;

responsive to receiving the broadcast request, transmitting from each of the compute nodes receiving the broadcast request to all other nodes the state of the cache line on that node, including, if at least one of the compute nodes has a correct copy of the cache line, transmitting from the at least one compute node to the first node the correct copy of the cache line; and updating by each node the state of the cache line in each node, in dependence upon one or more of the states of the cache line in all the nodes.

8. The computer of claim 7 wherein the cache controllers are further configured to function by retrieving by the first node the cache line from main memory if the first node does not receive a correct copy in response to the broadcast request.

9. The computer of claim 7 wherein the broadcast request includes a specification of a type of memory instruction that generated the cache miss.

10. The computer of claim 7 wherein the cache controllers are further configured to function by releasing, by the first node, the cache line for subsequent operations when the first node obtains a correct copy of the cache line.

11. The computer of claim 7 wherein the cache controllers are further configured to function by releasing, by the first node, the cache line for subsequent operations when the first node obtains a correct copy of the cache line, including releasing the cache line for memory operations before receiving responsive transmissions from all the nodes receiving the broadcast request.

12. The computer of claim 7 wherein the cache controllers are further configured to function by confirming to the first node that all nodes receiving the broadcast have completed the updating of the state of the cache line in each node.

13. A computer program product for maintaining cache coherence in a multi-node, symmetric multiprocessing computer, the computer comprising a plurality of compute nodes, each compute node comprising at least one processor operatively coupled through a cache controller to at least one cache of main memory, the main memory shared among the compute nodes, each cache controller coupled for data communications to cache controllers on other compute nodes, the computer program product disposed upon a computer readable storage medium, the computer program product comprising computer program instructions which when executed by the cache controllers cause the cache controllers and the compute nodes to function by:

responsive to a cache miss of a cache line on a first one of the compute nodes, broadcasting by the first compute node to other compute nodes a request for the cache line;

responsive to receiving the broadcast request, transmitting from each of the compute nodes receiving the broadcast request to all other nodes the state of the cache line on that node, including, if at least one of the compute nodes has a correct copy of the cache line, transmitting from the at least one compute node to the first node the correct copy of the cache line;

updating by each node the state of the cache line in each node, in dependence upon one or more of the states of the cache line in all the nodes.

14. The computer program product of claim 13 further comprising computer program instructions which when executed by the cache controllers cause the cache controllers and the compute nodes to function by retrieving by the first node the cache line from main memory if the first node does not receive a correct copy in response to the broadcast request.

15. The computer program product of claim 13 wherein the broadcast request includes a specification of a type of memory instruction that generated the cache miss.

16. The computer program product of claim 13 further comprising computer program instructions which when executed by the cache controllers cause the cache controllers and the compute nodes to function by releasing, by the first node, the cache line for subsequent operations when the first node obtains a correct copy of the cache line.

17. The computer program product of claim 13 further comprising computer program instructions which when executed by the cache controllers cause the cache controllers and the compute nodes to function by releasing, by the first node, the cache line for subsequent operations when the first node obtains a correct copy of the cache line, including releasing the cache line for memory operations before receiving responsive transmissions from all the nodes receiving the broadcast request.

18. The computer program product of claim 13 further comprising computer program instructions which when executed by the cache controllers cause the cache controllers and the compute nodes to function by confirming to the first node that all nodes receiving the broadcast have completed the updating of the state of the cache line in each node.

* * * * *